(12) United States Patent
Ogawa (10) Patent No.: US 11,993,172 B2
(45) Date of Patent: May 28, 2024

(54) POWER INFORMATION PROCESSING APPARATUS, POWER INFORMATION PROCESSING SYSTEM, AND POWER INFORMATION PROCESSING METHOD

(71) Applicant: HONDA MOTOR CO., LTD., Tokyo (JP)

(72) Inventor: Makoto Ogawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 601 days.

(21) Appl. No.: 17/201,213

(22) Filed: Mar. 15, 2021

(65) Prior Publication Data

US 2021/0300202 A1    Sep. 30, 2021

(30) Foreign Application Priority Data

Mar. 27, 2020 (JP) ................. 2020-058228

(51) Int. Cl.
*B60L 55/00*       (2019.01)
*B60L 53/63*       (2019.01)
(Continued)

(52) U.S. Cl.
CPC ............... *B60L 55/00* (2019.02); *B60L 53/63* (2019.02); *B60L 53/65* (2019.02); *B60L 58/12* (2019.02); *B60L 2240/72* (2013.01)

(58) Field of Classification Search
CPC .......... B60L 55/00; B60L 58/12; B60L 53/63; B60L 53/65; B60L 2240/72; H02J 7/00;
(Continued)

(56) References Cited

U.S. PATENT DOCUMENTS 9,153,966 B2   10/2015   Ishida
9,336,682 B2    5/2016   Oh et al.
(Continued)

FOREIGN PATENT DOCUMENTS

JP   2007-252117 A   9/2007
JP   2011-191266 A   9/2011
(Continued)

OTHER PUBLICATIONS

Office Action dated Jun. 2, 2022, issued in counterpart EP Application No. 21162915.9. (10 pages).
(Continued)

*Primary Examiner* — Andrew Joseph Rudy
(74) *Attorney, Agent, or Firm* — WHDA, LLP (57) ABSTRACT

A power information processing apparatus comprises: an obtaining unit configured to obtain information of a power system network and information of a plurality of electric vehicles; a determination unit configured to determine, based on a comparison between demand power required in the power system network in a blackout state and supply power that can be supplied from the plurality of electric vehicles, allocation of an electric vehicle, of the plurality of electric vehicles, which is used to discharge electric power to the power system network; and a guiding unit configured to guide, based on the allocation, each of the plurality of electric vehicles to a charging/discharging unit configured to discharge the electric power to the power system network.

17 Claims, 7 Drawing Sheets

(51) Int. Cl.
*B60L 53/65* (2019.01)
*B60L 58/12* (2019.01)

(58) Field of Classification Search
CPC ........ H02J 7/01; H02J 7/02; H02J 7/03; H02J 7/04; H02J 7/05; H02J 7/06; H02J 7/07; H02J 7/08; H02J 7/09; H02J 7/10; H02J 7/11; H02J 7/12; H02J 7/34; H02J 7/35; H02J 7/36; H02J 3/32; H02J 3/38; H02J 13/00
USPC .......................................................... 701/22
See application file for complete search history.

(56) References Cited

U.S. PATENT DOCUMENTS

| | | | | |
|---|---|---|---|---|
| 9,987,940 | B2* | 6/2018 | Uyeki | B60L 53/30 |
| 10,126,796 | B2* | 11/2018 | Dorn | B60L 53/63 |
| 10,926,659 | B2* | 2/2021 | Lee | B60L 53/51 |
| 11,201,339 | B2* | 12/2021 | Reum | H01M 8/0494 |
| 2011/0320115 | A1 | 12/2011 | Oh et al. | |
| 2012/0249068 | A1 | 10/2012 | Ishida | |
| 2017/0070089 | A1 | 3/2017 | Fukubayashi et al. | |

FOREIGN PATENT DOCUMENTS

| | | |
|---|---|---|
| JP | 2012-008113 A | 1/2012 |
| JP | 2013-223332 A | 10/2013 |
| JP | 5529894 B2 | 6/2014 |
| JP | 2014-236602 A | 12/2014 |
| JP | 2017-112806 A | 6/2017 |
| JP | 2017-158363 A | 9/2017 |
| WO | 2015/136920 A1 | 9/2015 |

OTHER PUBLICATIONS

Extended European Search Report dated Aug. 25, 2021, issued in counterpart EP Application No. 21162915.9. (14 pages).
Office Action dated Oct. 11, 2023, issued in counterpart EP Application No. 21162915.9. (9 pages).
Office Action dated Oct. 27, 2023 issued in counterpart JP application No. 2020058228 with English translation. (10 pages).

* cited by examiner

| PARAMETER NAME | DESTINATION (NORMAL STATE) | DESTINATION (BLACKOUT STATE) |
|---|---|---|
| POWER SYSTEM STATE (ST401) | SYSTEM n [NORMAL STATE] | · SYSTEM n [BLACKOUT STATE]<br>· DEMAND INFORMATION ON DEMAND SIDE [POSITION OF EACH SHELTER, POSITION OF CHARGER/DISCHARGER, AMOUNT OF ELECTRIC POWER NECESSARY FOR SHELTER, TIMING AT WHICH ELECTRIC POWER IS NECESSARY, AND RESTORATION STATUS OF BLACKOUT] |
| CHARGER/DISCHARGER STATE (ST402) | CHARGER/DISCHARGER n [POSITION (DISTANCE FROM CURRENT POSITION) AND AVAILABLE STATE] | |
| POWER REQUEST (ST403) | POWER SYSTEM NETWORK IN NORMAL STATE n "EXISTS" | POWER SYSTEM NETWORK IN BLACKOUT STATE n "EXISTS" |
| POWER RESPONSE (ST404) | USER OF ELECTRIC VEHICLE n [INTENDING TO CHARGE BATTERY AT LOW COST] | USER OF ELECTRIC VEHICLE n [INTENDING TO DISCHARGE ELECTRIC POWER AND TO SUPPORT BLACKOUT AREA] [INTENDING TO MAKE PROFIT BY DISCHARGING ELECTRIC POWER WHEN BLACKOUT OCCURS] |
| POWER TRADING PRICE (ST405) TRAVELING POWER PRICE (ST405) | NORMAL STATE [n1 YEN] [n3 YEN] | BLACKOUT STATE [n1 YEN] [n3 YEN] |
| CHARGED STATE OF STORAGE BATTERY OF ELECTRIC VEHICLE (ST406) | SUPPLY INFORMATION ON POWER SUPPLY SIDE [POSITION INFORMATION (TRAVELING POSITION, STOPPING PLACE), INFORMATION (CAPACITY, SOC) INDICATING CHARGED STATE, AND INFORMATION INDICATING TYPE OF ELECTRIC VEHICLE] | |
| ROUTE CONDITION (ST407) | ROUTE INFORMATION [MAP INFORMATION, TRAFFIC INFORMATION, AND INFORMATION OF ROUTE INCLUDING CLOSED SECTION] | |

| TYPE | LARGE | MEDIUM | SMALL |
|---|---|---|---|
| BATTERY CAPACITY | P3 | P2 | P1 |

FIG. 8

POWER INFORMATION PROCESSING APPARATUS, POWER INFORMATION PROCESSING SYSTEM, AND POWER INFORMATION PROCESSING METHOD

This application claims priority to and the benefit of Japanese Patent Application No. 2020-058228 filed on Mar. 27, 2020, the entire disclosure of which is incorporated herein by reference.

BACKGROUND OF THE INVENTION

Field of the Invention

The present invention relates to a power information processing apparatus, a power information processing system, and a power information processing method.

Description of the Related Art

Japanese Patent Laid-Open No. 2007-252117 discloses a system capable of discharging emergency energy by connecting the storage batteries of a plurality of electric vehicles (EVs) to a charging/discharging apparatus in case of emergency in which supply power is in shortage. Also, Japanese Patent No. 5529894 discloses a power system control system that guides an EV not connected to a charging/discharging apparatus by using three parameters, that is, the power trading price or the $CO_2$ emission level, the charged state of an EV storage battery, and the distance between the charging/discharging apparatus and the EV, at a normal time.

Unfortunately, these systems according to the related arts may pose the problems that it is impossible to effectively use the battery energies of the storage batteries of electric vehicles scattered in various places and not in operation, and, especially at the time of disaster, it is impossible to balance the demand and supply of electric power and allocate an electric vehicle as the supply side to the demand side requiring electric power.

The present invention provides a power information processing technique capable of allocating and guiding an electric vehicle as the supply side to the demand side of a power system network requiring electric power.

SUMMARY OF THE INVENTION

According to one aspect of the present invention, there is provided a power information processing apparatus comprising: an obtaining unit configured to obtain information of a power system network and information of a plurality of electric vehicles; a determination unit configured to determine, based on a comparison between demand power required in the power system network in a blackout state and supply power that can be supplied from the plurality of electric vehicles, allocation of an electric vehicle, of the plurality of electric vehicles, which is used to discharge electric power to the power system network; and a guiding unit configured to guide, based on the allocation, each of the plurality of electric vehicles to a charging/discharging unit configured to discharge the electric power to the power system network.

According to another aspect of the present invention, there is provided a power information processing system comprising: an obtaining unit configured to obtain information of a power system network and information of a plurality of electric vehicles; a determination unit configured to determine, based on a comparison between demand power required in the power system network in a blackout state and supply power that can be supplied from the plurality of electric vehicles, allocation of an electric vehicle, of the plurality of electric vehicles, which is used to discharge electric power to the power system network; and a guiding unit configured to guide, based on the allocation, each of the plurality of electric vehicles to a charging/discharging unit configured to discharge the electric power to the power system network.

According to still another aspect of the present invention, there is provided a power information processing method for a power information processing apparatus, comprising: an obtaining step of obtaining information of a power system network and information of a plurality of electric vehicles; a determination step of determining, based on a comparison between demand power required in the power system network in a blackout state and supply power that can be supplied from the plurality of electric vehicles, allocation of an electric vehicle, of the plurality of electric vehicles, which is used to discharge electric power to the power system network; and a guiding step of guiding, based on the allocation, each of the plurality of electric vehicles to a charging/discharging unit configured to discharge the electric power to the power system network.

The present invention makes it possible to allocate and guide an electric vehicle as the supply side to the demand side of a power system network requiring electric power.

DESCRIPTION OF THE EMBODIMENTS

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar arrangements, and redundant description thereof is omitted.

[System Arrangement]

Figure 1:
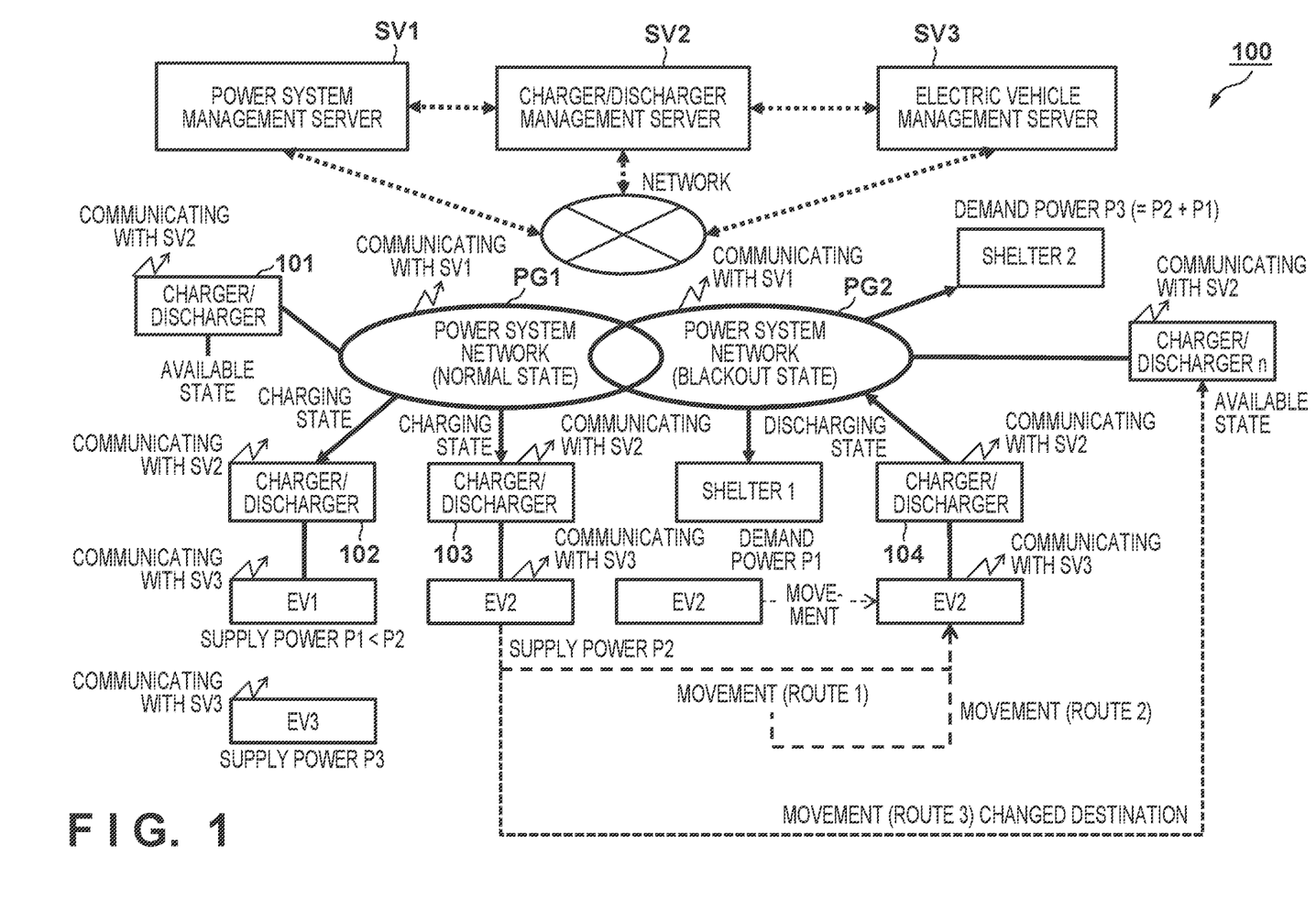
FIG. 1 is a view showing an arrangement example of a power information management system according to an embodiment.

The arrangement of a power information management system 100 will be explained below. FIG. 1 is a view showing an arrangement example of the power information management system 100. In this arrangement example shown in FIG. 1, the power information management system 100 includes a power system management server SV1, a charger/discharger management server SV2 functioning as a power information management apparatus, and an electric vehicle management server SV3 (to be also referred to as an "EV management server SV3" hereinafter). In the system arrangement shown in FIG. 1, the power system management server SV1, the charger/discharger management server SV2 (a power information management apparatus), and the EV management server SV3 are separated apparatuses, but they may also be integrated into one information processing apparatus. It is also possible to integrate the charger/discharger management server SV2 (a power information management apparatus) with the power system management server SV1 or the EV management server SV3.

[Basic Arrangement of Server]

(Charger/Discharger Management Server SV2)

Figure 2:
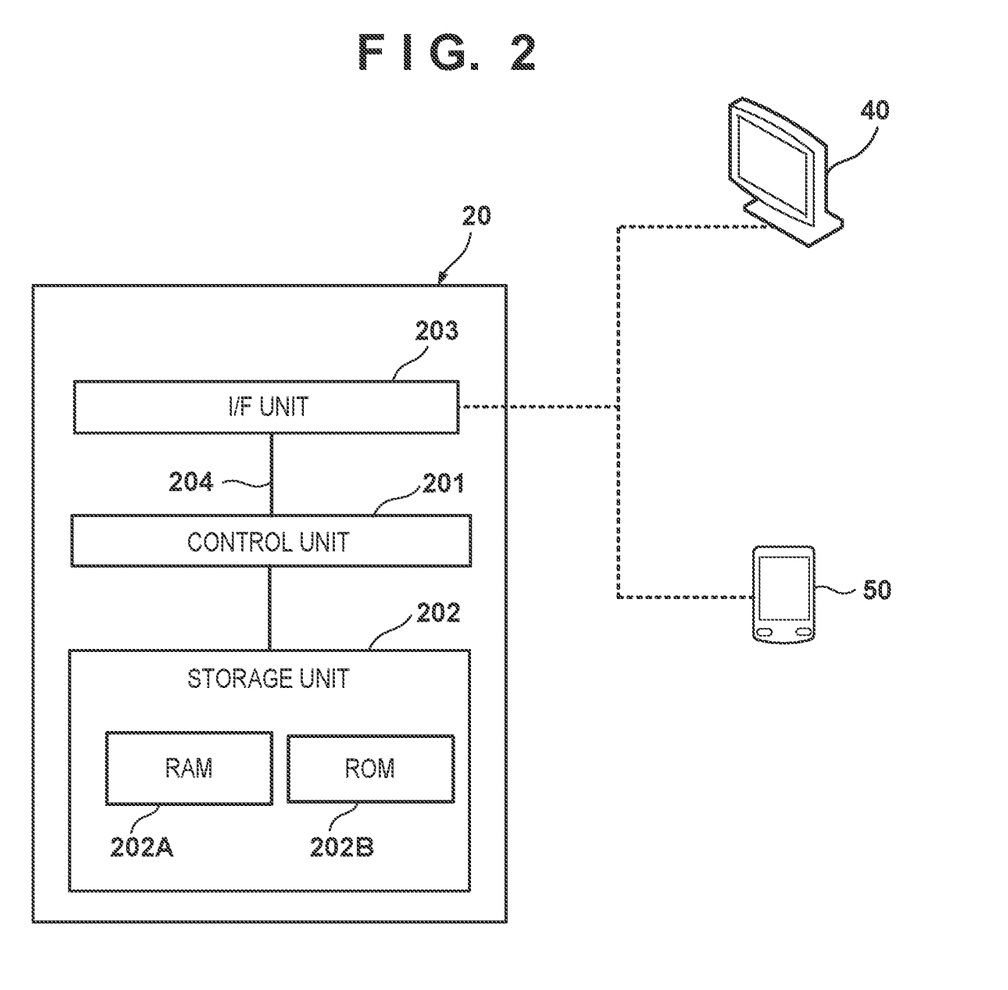
FIG. 2 is a block diagram showing the basic arrangement of a server according to the embodiment.

FIG. 2 is a block diagram showing the basic arrangement of each server. FIG. 2 shows the charger/discharger management server SV2 (a power information management apparatus) as a typical example of the servers. The charger/discharger management server SV2 includes a control unit 201 such as a CPU that functions as a processing unit, a storage unit 202 including a RAM 202A, a ROM 202B, and the like, and an I/F unit 203 functioning as a communication unit for communicating with an external device. These blocks shown in FIG. 2 are connected to each other via a system bus 204 so that they can communicate with each other.

The I/F unit 203 (a communication unit) can communicate with a plurality of chargers/dischargers (101, 102, . . . , n) connected to power system networks PG1 and PG2 and external devices across a network. These external devices include an electric vehicle EV having a communication apparatus, in addition to the power system management server SV1 and the EV management server SV3.

The RAM 202A of the storage unit 202 functions as an arithmetic processing area of the control unit 201, and can store information obtained via the I/F unit 203 (a communication unit) and the results of arithmetic operations processed by the control unit 201. The ROM 202B functions as a storage area for storing various programs for the control unit 201 to perform processing. A display device 40 and a portable information terminal device 50 as an input device can be connected to the charger/discharger management server SV2. This makes it possible to set parameters for arithmetic processing from the information terminal device 50, and provide information to the user by displaying the arithmetic results on the display device 40.

The control unit 201 executes the various programs stored in the ROM 202B, determines allocation for guiding a plurality of electric vehicles (EV1, EV2, . . . , EVn) to the chargers/dischargers (104, . . . , n) connected to the power system network PG2 in a blackout state, and performs information processing for providing route information for guiding each electric vehicle to the charger/discharger (104, . . . , n) based on the determined allocation. The control unit 201 updates the generation and change of the route information for guiding the electric vehicle to each charger/discharger in real time, and distributes the route information to each electric vehicle.

The charger/discharger management server SV2 communicates with the plurality of chargers/dischargers (101, 102, . . . , n) connected to the power system networks PG1 and PG2 via the I/F unit 203 (a communication unit), and obtains position information of the plurality of chargers/dischargers (101, 102, . . . , n), and information indicating the availability of each charger/discharger, as charger/discharger state information.

The position information of the plurality of chargers/dischargers contains information of the power system network to which each charger/discharger is connected, the installation position of the charger/discharger, and an area or a place (for example, shelter 1 or 2) to which the charger/discharger can supply electric power. In the arrangement of the power information management system 100 shown in FIG. 1, the power system network PG1 is in a normal state, and the chargers/dischargers 101, 102, and 103 are connected to the power system network PG1. Of these chargers/dischargers, the charger/discharger 101 is in an available state in which no electric vehicle EV is connected. Also, the electric vehicles EV1 and EV2 are respectively connected to the chargers/dischargers 102 and 103, so the chargers/dischargers 102 and 103 are in a charging state. Furthermore, the power system network PG2 is in a blackout state, and the chargers/dischargers 104 and n are connected to the power system network PG2.

The control unit 201 determines allocation for guiding an electric vehicle (EV2 in this example shown in FIG. 1), among the plurality electric vehicles, to the charger/discharger 104 connected to the power system network PG2 in a blackout state, and performs information processing for providing route information for guiding the electric vehicle EV2 to the charger/discharger 104 based on the determined allocation.

In the example shown in FIG. 1, the electric vehicle EV2 charged by the charger/discharger 103 moves along route 1 based on the allocation and connects to the charger/discharger 104, and the charger/discharger 104 is in a discharged state of electric power stored in the battery of the connected electric vehicle EV2. This discharging from the charger/discharger 104 supplies electric power to a power demand area (to be also simply referred to as an "area" hereinafter) such as shelter 1.

Based on information of the route condition of a movement route obtained from the EV management server SV3, the control unit 201 can update the generation and change of route information for guiding an electric vehicle to each charger/discharger in real time and distribute the route information to the electric vehicle. For example, if a closed section is set midway along route 1, the control unit 201 changes the route information in real time, and provides the route information for guiding the electric vehicle EV2 to the charger/discharger 104 based on updated route 2.

Based on information (to be referred to as "demand information on the demand side" hereinafter) on a side requiring electric power obtained from the power system management server SV1, the control unit 201 can also determine the priority of power supply, and perform guidance that changes the destination so that the electric vehicle moves to the charger/discharger n having high priority. If a plurality of areas in the power system network require electric power, the control unit 201 compares the demand powers of these areas, and determines allocation by giving priority to an area having a large demand power. In the example shown in FIG. 1, the control unit 201 changes the destination from the charger/discharger 104 as the initial destination to the charger/discharger n, and provides route information for guiding the electric vehicle EV2 to the charger/discharger n based on route 3.

The demand information on the demand side requiring electric power contains information indicating, for example, the position of a shelter (evacuation space), the position of a charger/discharger corresponding to each shelter in a power system network in a blackout state, the amount of electric power required in the power system network (each shelter), the timing at which electric power is necessary, and the blackout restoration status.

Also, the charger/discharger management server SV2 communicates with the EV management server SV3 via the I/F unit 203, and obtains the positions (the traveling position, the stopping places) of the plurality of electric vehicles, information (the capacity, SOC: State Of Charge) indicating the charged states of the storage batteries of a plurality of electric vehicles, and information indicating the type (for example, large, medium, or small) of each electric vehicle. As information (to be referred to as "supply information on the power supply side" hereinafter) on the power supply side, the charger/discharger management server SV2 obtains the positions of a plurality of electric vehicles, information indicating the charged states of the batteries mounted in the plurality of electric vehicles, and information indicating the types of the plurality of electric vehicles.

Furthermore, the charger/discharger management server SV2 communicates with the EV management server SV3, obtains information (for example, the presence/absence of a closed section) of the route condition of a movement route for guiding an electric vehicle to a charger/discharger, and obtains, as a response (power response) to a power request, information indicating the intention of the user of the electric vehicle with respect to power trading. The information indicating the intention of the user contains, for example, information indicating that the user intends to charge the battery at low cost in a normal state, information indicating that the user intends to move to an area in a blackout state as a volunteer and discharge (supply) electric power of the battery of the electric vehicle, that is, the user intends to support the blackout area, or information indicating that the user intends to make a profit by discharging electric power of the battery of the electric vehicle when a blackout occurs.

The charger/discharger management server SV2 communicates with the power system management server SV1 via the I/F unit 203, and obtains state information indicating a state (power system state) showing whether the power system networks PG1 and PG2 are in a normal state or a blackout state. By communicating with the power system management server SV1, the charger/discharger management server SV2 can also obtain information indicating a power request input from a system power company and information of a power trading price or a traveling power price required for an electric vehicle to travel.

If the power system network is in a blackout state in the state information indicating the power system state, the charger/discharger management server SV2 obtains, as demand information on the demand side requiring electric power, information indicating the position of a shelter, the position of a charger/discharger corresponding to each shelter in the power system network in a blackout state, the amount of electric power required in the shelter, the timing at which electric power is necessary, and the blackout restoration status.

The information indicating the timing at which electric power is necessary contains, for example, time information that divides one day into time zones, and information of a period over a plurality of days. Also, the information indicating the blackout restoration status contains map-area information combining map information and an area where electric power is supplied.

If the power system network is in a blackout state, the control unit 201 of the charger/discharger management server SV2 compares the supply information on the power supply side with the demand information on the demand side requiring electric power, allocates a plurality of electric vehicles based on the comparison result, and guides the plurality of electric vehicles based on the allocation result.

(Power System Management Server SV1)

The power system management server SV1 has the same basic arrangement as the block diagram shown in FIG. 2. The control unit of the power system management server SV1 monitors the power system networks PG1 and PG2 across the network, and collects state information indicating a state (power system state) showing whether the power system networks PG1 and PG2 are in a normal state or a blackout state. The I/F unit of the power system management server SV1 transmits the collected state information indicating the power system state to the charger/discharger management server SV2 (a power information management apparatus).

If the power system network is in a blackout state, the state information contains demand information on the demand side. This demand information on the demand side contains information indicating, for example, the position of a shelter, the position of a charger/discharger corresponding to each shelter in the power system network in a blackout state, the amount of electric power required in the shelter, the timing at which electric power is necessary, and the blackout restoration status.

Also, the control unit of the power system management server SV1 obtains information indicating a power request input from the system power company across the network, and transmits the information to the charger/discharger management server SV2. This information indicating the power request is information indicating whether the system power company requires electric power in the power system networks PG1 and PG2. For example, if a power shortage occurs in a power system network in a normal state, a power request "exists" is set. Likewise, if a power shortage occurs in a power system network in a blackout state, a power request "exists" is set.

In addition, the control unit of the power system management server SV1 obtains information indicating a power trading price (for example, n1 yen in a power system network in a normal state, and n2 yen in a power system network in a blackout state) input from the system power company, and transmits the information to the charger/discharger management server SV2 via the I/F unit. Furthermore, the control unit of the power system management server SV1 obtains information of a traveling power price necessary for an electric vehicle to travel (for example, n3 yen as a traveling cost for an electric vehicle to move to a power system network in a normal state or a blackout state), and transmits the information to the charger/discharger management server SV2 via the I/F unit.

(EV Management Server SV3)

The EV management server SV3 also has the same basic arrangement as the block diagram shown in FIG. 2. The control unit of the EV management server SV3 communicates with the plurality of electric vehicles (EV1, EV2, . . . ) across the network, and obtains the positions (the traveling positions, the stopping places) of the plurality of electric vehicles (EV1, EV2, . . . ), information (the capacity, SOC) indicating the charged states of the storage batteries of the plurality of electric vehicles, and information indicating the type (for example, large, medium, and small) of each electric vehicle. These pieces of information obtained by the EV management server SV3 are supply information on the power supply side.

The I/F unit (a communication unit) of the EV management server SV3 wirelessly communicates with an external server apparatus that provides map information and traffic information, allocates the plurality of electric vehicles to destinations (chargers/dischargers), and obtains information of a route for guiding each electric vehicle to the destination (charger/discharger), map information, and information (to be also referred to as "route information" hereinafter) of a route including a closed section.

The I/F unit of the EV management server SV3 transmits the collected power-supply-side supply information and route information to the charger/discharger management server SV2 (a power information management apparatus).

Based on the route information transmitted from the EV management server SV3, the control unit 201 of the charger/discharger management server SV2 (a power information management apparatus) performs, for example, route search from the current positions of the plurality of electric vehicles to the destinations. If the route information indicates that road closure occurs in a partial section, the control unit 201 changes (updates) the route in real time. In this case, the control unit 201 can change the route by selecting a shortest route by using the distance to the destination as a parameter. When selecting a movement route from the current position of each of the plurality of electric vehicles to a charger/discharger as the guidance destination, the control unit 201 can generate route information by selecting a route along which the ratio of a flat route or a downhill route is high by avoiding an uphill route based on the map information. Therefore, when the electric vehicle moves from the current position to the charger/discharger as the guidance destination, it is possible to reduce the power consumption in the electric vehicle, and maximally secure electric power that can be supplied.

(Outlines of Arrangements of Charger/Discharger and Electric Vehicle)

Figure 3:
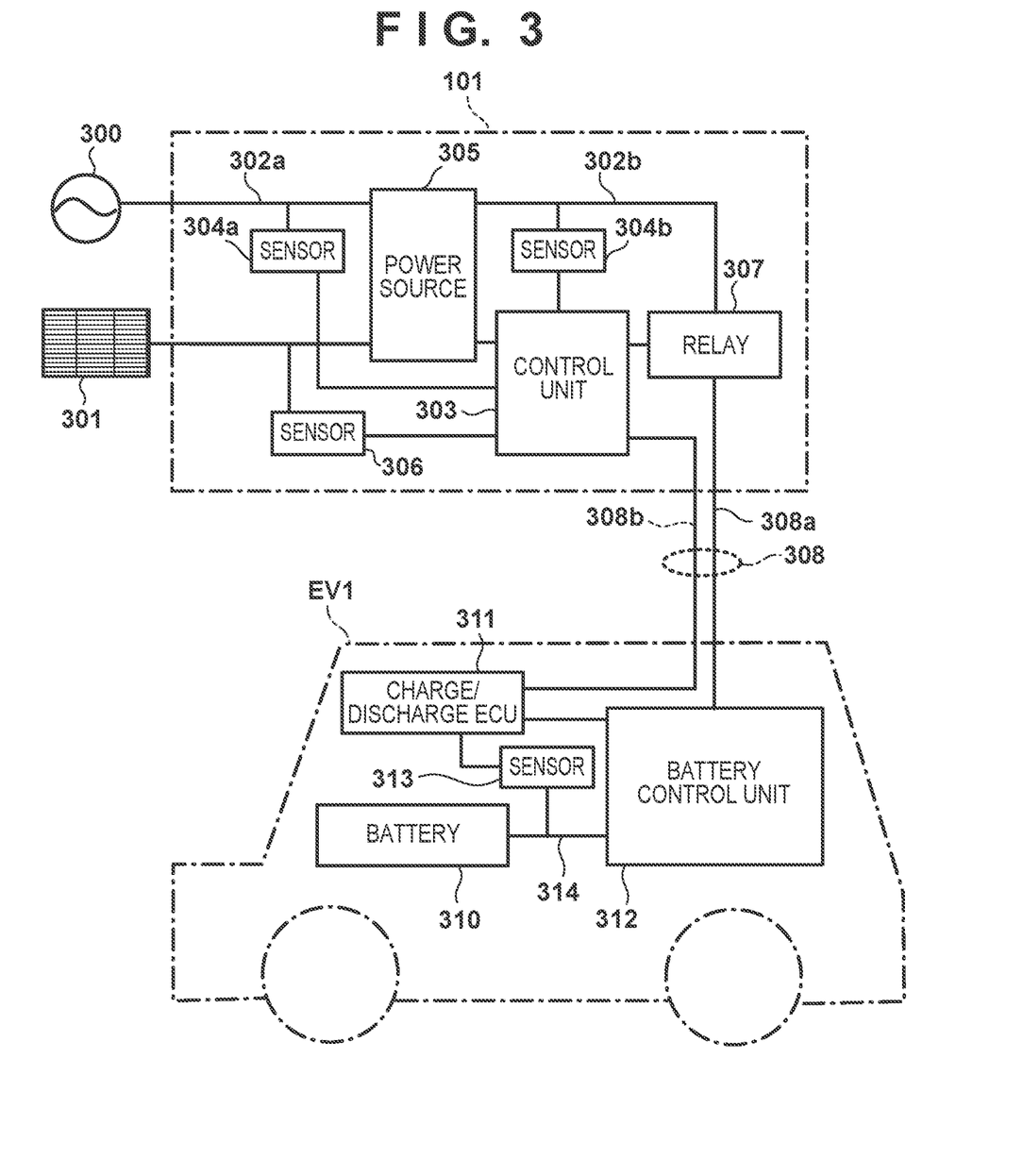
FIG. 3 is a block diagram of a charger/discharger and an electric vehicle according to the embodiment.

FIG. 3 is a block diagram of the charger/discharger 101 (a charge/discharge controller) and the electric vehicle EV1 according to the embodiment. FIG. 3 shows an example in which the charger/discharger 101 (a charge/discharge controller) controls charging/discharging of a battery 310 of the electric vehicle EV1. The electric vehicle EV1 is a plugin hybrid vehicle (PHEV) or the like, and the battery 310 is a lithium-ion battery or the like.

The charger/discharger 101 can configure a commercial power management apparatus in a charge station, and can also configure a power management apparatus to be installed in a house. At the time of blackout, the charger/discharger 101 may also configure a power management apparatus to be installed in a shelter or the like. The charger/discharger 101 (a charge/discharge controller) includes a power line 302a connected to a power system 300 (a power system network). At the time of charging, AC power is supplied to the power line 302a from the power system 300 (a power system network) as a power supply facility such as a system power company. At the time of discharging, the power line 302a outputs AC power to the power system 300 (a power system network). A power source 305 is connected to the power line 302a. The power source 305 includes, for example, an AC/DC converter and a DC/DC converter, and can perform a predetermined power conversion process during charging/discharging under the control of a control unit 303.

An external cable 308 is connected, via a relay 307, to a power line 302b connected to the power source 305. The external cable 308 is a transmission cable detachably connectable to the electric vehicle EV1. The external cable 308 includes a power line 308a for supplying electric power, and a communication line 308b. The relay 307 connects and disconnects the power lines 302b and 308a.

A solar power generator 301 is connected to the charger/discharger 101 (a charge/discharge controller). The solar power generator 301 includes a solar cell panel and generates DC power. At the time of charging, the power source 305 converts electric power generated by the solar power generator 301 into predetermined electric power by the DC/DC converter, and outputs the electric power to the power line 302b, under the control of the control unit 303. At the time of discharging, the power source 305 can convert electric power generated by the solar power generator 301 into predetermined electric power, and output the electric power to the power line 302a, under the control of the control unit 303.

The charger/discharger 101 (a charge/discharge controller) includes the control unit 303. The control unit 303 includes, for example, a processor such as a CPU, a storage device such as a semiconductor memory, and an input/output interface and a communication interface for an external device. The storage device stores programs to be executed by the processor, data to be used by the processor to perform processing, and the like.

The control unit 303 controls the power source 305 and the relay 307. Also, the control unit 303 obtains the detection results of sensors 304a, 304b, and 306. The sensor 304a is a sensor for detecting the physical amount of electric power of the power line 302a, and is a sensor for measuring the AC voltage in this embodiment. The sensor 304b is a sensor for detecting the physical amount of electric power of the power line 302b, and is a sensor for measuring the DC voltage in this embodiment. The sensor 306 is a sensor for detecting the physical amount of electric power generated by the solar power generator 301, and measures the DC voltage generated by the solar power generator 301 in this embodiment. The communication line 308b is connected to the control unit 303. When the external cable 308 is connected to the electric vehicle EV1, the control unit 303 includes a communication unit and can communicate with a charge/discharge ECU 311 of the electric vehicle EV1 and the charger/discharger management server SV2.

The electric vehicle EV1 includes the charge/discharge ECU 311, a battery control unit 312, and a sensor 313 as components related to the battery 310. The charge/discharge ECU 311 includes, for example, a processor such as a CPU, a storage device such as a semiconductor memory, and an input/output interface and a communication interface for an external device. The charge/discharge ECU 311 can communicate with the control unit 303 of the charger/discharger 101 and the charger/discharger management server SV2 via the communication interface.

The storage device stores programs to be executed by the processor, data to be used by the processor to perform processing, and the like. The charge/discharge ECU 311 controls the battery control unit 312. Also, the charge/discharge ECU 311 obtains the detection result of the sensor 313. The sensor 313 is a sensor for detecting the physical amount of electric power of a power line 314 between the battery control unit 312 and the battery 310, and is a sensor for measuring the DC voltage in this embodiment.

At the time of charging, the battery control unit 312 performs charge/discharge control for outputting electric power supplied from the charger/discharger 101 (a charge/discharge controller) to the battery 313, under the control of the charge/discharge ECU 311. At the time of discharging, the battery control unit 312 performs discharge control for outputting electric power stored in the battery 313 to the charger/discharger 101 (a charge/discharge controller).

(Processing Procedure)

Figure 4:
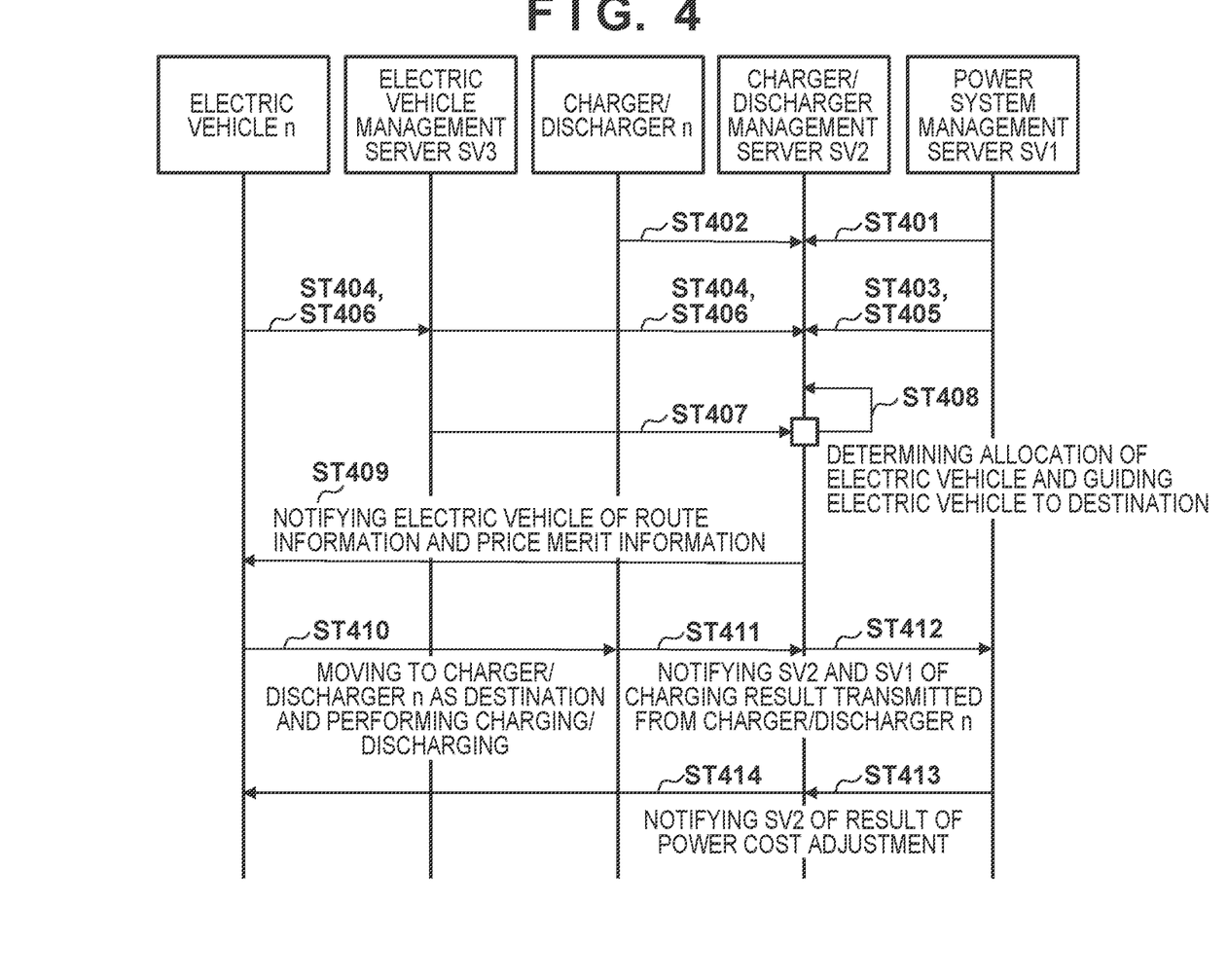
FIG. 4 is a view showing a processing procedure of the power information management system.

FIG. 4 is a view showing the processing procedure of the power information processing system 100. In ST401, as data transmission from the power system management server SV1 to the charger/discharger management server SV2, the power system management server SV1 transmits state information indicating a state (power system state) in which the power system networks PG1 and PG2 are in a normal state or a blackout state. If the power system network is in a blackout state, the state information contains demand information on the demand side. This demand information on the demand side contains information indicating the position of a charger/discharger corresponding to each shelter in the power system network in a blackout state, the amount of electric power necessary for the shelter, the timing at which electric power is necessary, and the restoration status of blackout.

Also, the power system management server SV1 transmits information (power request information) indicating whether the system power company requires electric power in the power system networks PG1 and PG2 to the charger/discharger management server SV2 (ST403).

Furthermore, the power system management server SV1 transmits information of the power trading price input from the system power company and the traveling power price required for the electric vehicle to travel to the charger/discharger management server SV2 (ST405).

In ST402, as data transmission from the charger/discharger n to the charger/discharger management server SV2, the charger/discharger n transmits position information of the charger/discharger and information indicating the availability of the charger/discharger, as charger/discharger state information, to the charger/discharger management server SV2.

As data transmission from the electric vehicle EVn to the EV management server SV3, the electric vehicle EVn transmits information indicating the intention of the user of the electric vehicle with respect to power trading, as a response (power response) to the power request (ST404).

The electric vehicle EVn also transmits the position (the traveling position, the stopping place) of the electric vehicle, information (the capacity, SOC) indicating the charged states of the storage batteries of the plurality of electric vehicles, and information indicating the type of each electric vehicle to the EV management server SV3 (ST406). Then, the EV management server SV3 transmits the information (supply information on the power supply side) obtained from each electric vehicle to the charger/discharger management server SV2.

In addition, the EV management server SV3 obtains map information, traffic information, and information (route information) of a route having a closed section from an external server apparatus, and transmits these pieces of information to the charger/discharger management server SV2 (ST407).

In ST408, the control unit 201 determines allocation for guiding the plurality of electric vehicles (EV1, EV2, . . . , EVn) to the chargers/dischargers (104, . . . , n) connected to the power system network PG2 in a blackout state based on the demand-side demand information (ST401) and the power-supply-side supply information (ST406), and generates route information for guiding the electric vehicles to the chargers/dischargers (104, . . . , n) based on the determined allocation. Then, the control unit 201 guides the plurality of electric vehicles based on the generated route information.

Figure 5:
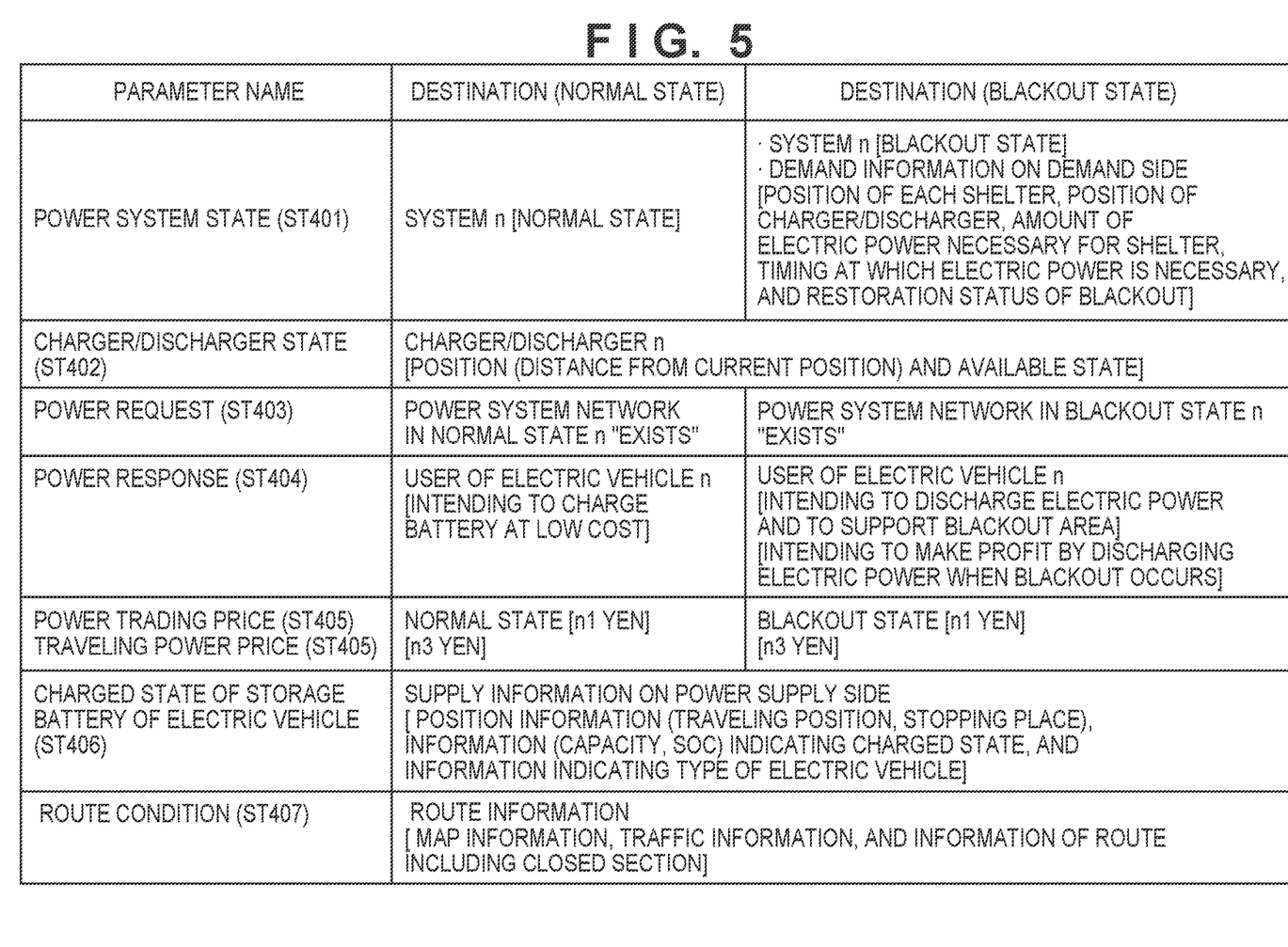
FIG. 5 is a view showing an example of a state in which information transmitted to a charger/discharger management server is stored in the form of a table.

The various pieces of information transmitted to the charger/discharger management server SV2 are stored, for example, in the form of a table in the storage unit 202. FIG. 5 is a view showing an example of a state in which the pieces of information transmitted to the charger/discharger management server SV2 are stored in the form of a table. The data transmission from ST401 to ST407 is sequentially executed at a predetermined timing, and the data in the form of a table shown in FIG. 5 is updated based on the data transmission. Based on the transmitted data, the control unit 201 of the charger/discharger management server SV2 sequentially executes the process of determining allocation of the plurality of electric vehicles, the process of generating route information, and the process of guiding the plurality of electric vehicles, at a predetermined timing in synchronism with the data transmission timing (ST408).

In ST409, the control unit 201 of the charger/discharger management server SV2 notifies the plurality of electric vehicles of route information (route guidance) for guiding each electric vehicle to the charger/discharger n based on the allocation, and price merit information when the electric vehicle moves to the charger/discharger n in the guidance destination as the destination.

Based on the power trading price, the control unit 201 of the charger/discharger management server SV2 calculates the power trading balance when the electric vehicle n charges or discharges the electric power charged in the battery 310, based on the power trading price. The control unit 201 calculates the traveling cost required for the electric vehicle to travel, based on the traveling power price and the traveling distance from the current position to the charger/discharger n as the destination. Then, the control unit 201 notifies the plurality of electric vehicles of the result of subtracting the traveling cost from the trading balance of charge/discharge, as the price merit information. This makes it possible to provide the user of the electric vehicle with information visualizing the power charge/discharge balance and the movement cost, together with the route information resulting from the movement.

In ST410, the electric vehicle n moves to the charger/discharger n as the destination and performs charging/discharging. In ST411, the charger/discharger n notifies the charger/discharger management server SV2 of the charging result of the electric vehicle n, and the charger/discharger management server SV2 notifies the power system management server SV1 of the charging result transmitted from the charger/discharger n (ST412). The power system management server SV1 performs a power cost adjusting process based on the charging result, and notifies the charger/discharger management server SV2 of the result of the power cost adjustment (ST413). The charger/discharger management server SV2 notifies the electric vehicle n of the result of the power cost adjustment transmitted from the power system management server SV1, and terminates the process (ST414).

(Practical Processing Example in ST408)

Figure 6:
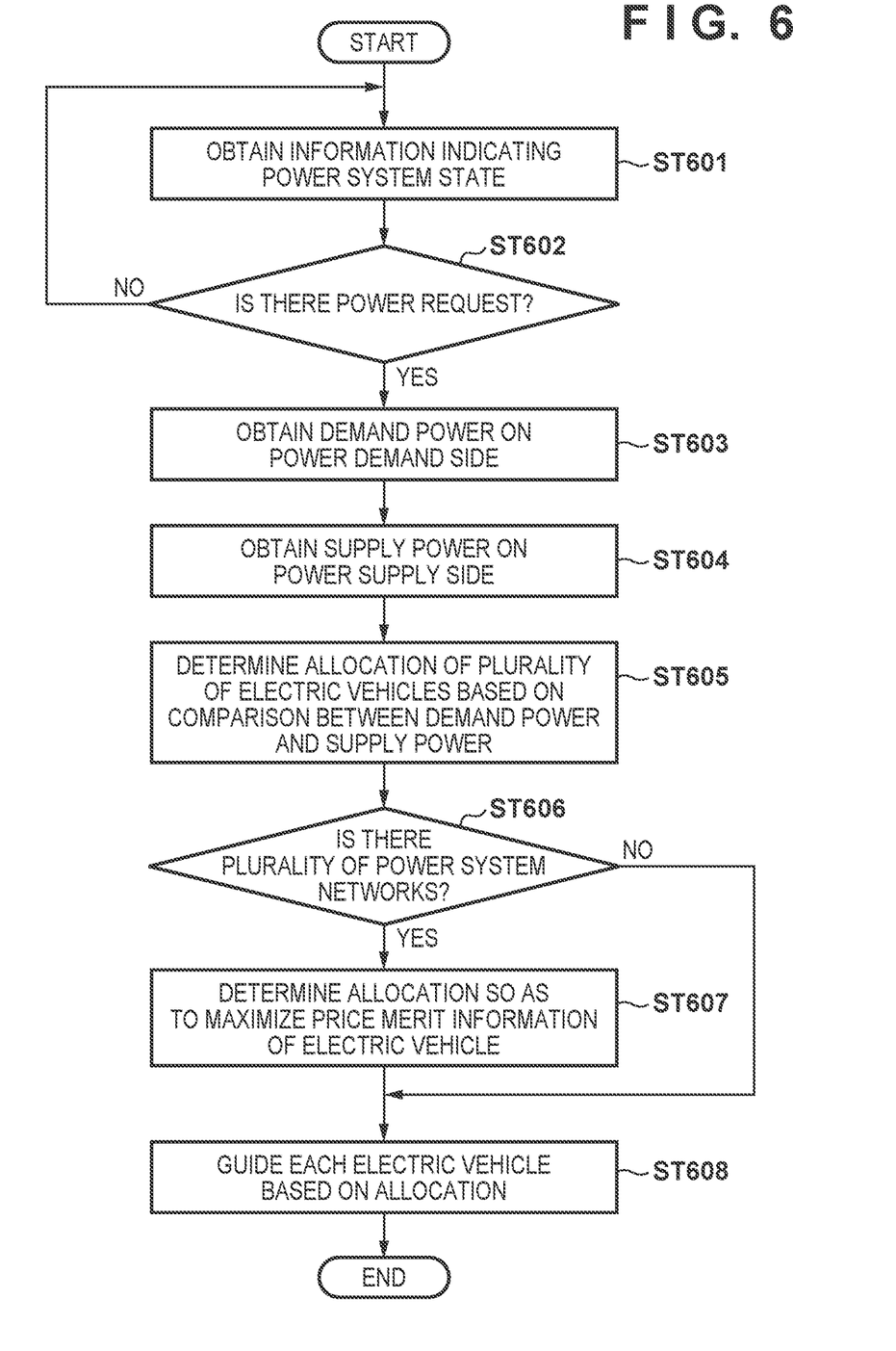
FIG. 6 is a flowchart for explaining a practical processing procedure in ST408 of FIG. 4.

FIG. 6 is a flowchart for explaining a practical procedure in ST408.

In ST601, the control unit 201 of the charger/discharger management server SV2 obtains state information indicating a state (power system state) in which the power system network is in a normal state or a blackout state. The control unit 201 obtains this state information based on the information (ST401 in FIG. 4) transmitted from the power system management server SV1.

In ST602, the control unit 201 determines whether the target power system network requires electric power, based on the power request information transmitted from the power system management server SV1. If it is determined in ST602 that no electric power is necessary (ST602—No), the control unit 201 returns the process to ST601, and repetitively executes the same process. If it is determined in ST602 that the target power system network requires electric energy (if a power request "exists" is set in the power request information: ST602—Yes), the control unit 201 advances the process to ST603.

In ST603, the control unit 201 obtains the demand power on the power demand side. Based on the demand information on the demand side requiring electric power, the control unit 201 obtains the demand power. The demand information on the demand side contains information indicating the position of a shelter (evacuation area), the position of a charger/discharger corresponding to each shelter in the power system network in a blackout state, the amount of electric power required in the shelter, the timing at which electric power is required, and the blackout restoration status.

In ST604, the control unit 201 obtains the supply power on the power supply side. The control unit 201 obtains the supply power based on supply information on the power supply side capable of supplying electric power. The supply information on the power supply side contains the positions (the traveling positions, the stopping places) of the plurality of electric vehicles, information (the capacity, SOC) indicating the charged states of the storage batteries of the plurality of electric vehicles, and information indicating the type of each electric vehicle.

In ST605, the control unit 201 determines allocation of the plurality of electric vehicles based on the comparison between the demand power (ST603) and the supply power (ST604). Based on the comparison result, the control unit 201 determines allocation of the plurality of electric vehicles so as to make the demand power and the supply power equal.

Based on the demand information, the control unit 201 specifies which evacuation area requires how much electric power at that timing in the power system network in a blackout state. In addition, based on the supply information, the control unit 201 can specify the position of each of the plurality of electric vehicles and the power supply capability of the electric vehicle.

For example, let P1 be demand electric power required in a first area (shelter 1) in the power system network PG2 in a blackout state shown in FIG. 1. Assume that the supply power of the electric vehicle EV2 is P2, and the supply power of the electric vehicle EV1 is P1 lower than P2. In this case, based on the comparison between the demand power and the supply power, the control unit 201 determines allocation such that the electric vehicle EV2 moves to the charger/discharger 104 corresponding to the first area (shelter 1) so as to make the demand power and the supply power equal.

Also, if a plurality of areas in the power system network require electric power, the control unit 201 compares the demand powers of the plurality of areas (for example, shelters) in the power system network, and determines allocation by giving priority to an area requiring a large demand power. Assume that in the power system network PG2 shown in FIG. 1, the necessary demand power is P3 in a second area (shelter 2), and the demand power P3 is electric power equal to P1+P2. In this case, the control unit 201 determines allocation by giving priority to the second area having a large demand power over the first area.

In this case, based on the comparison between the demand power and the supply power, the control unit 201 can determine allocation such that the electric vehicle EV2 (the supply power P2) and the electric vehicle EV1 (the supply power P1) move to the charger/discharger n corresponding to the second area (shelter 1) so as to make the demand power P3 (=P2+P1) and the supply power equal. The control unit 201 can also determine allocation so that the electric vehicle EV3 (the supply power P3) moves to the charger/discharger n corresponding to the second area (shelter 1).

On the other hand, if the number of electric vehicles is larger than that of chargers/dischargers corresponding to the destination (for example, the second area) as the movement destination, electric vehicles that cannot be connected to any chargers/dischargers cannot discharge power, so a power shortage occurs. To avoid this power shortage state, the control unit 201 determines the number of electric vehicles to be allocated in accordance with the number of chargers/dischargers corresponding to the destination (for example, the second area) as the movement destination. If a plurality of electric vehicles are allocated to one charger/discharger n, a power shortage can occur. In this case, therefore, the control unit 201 determines allocation such that the electric vehicle EV3 (the supply power P3) moves to the charger/discharger n corresponding to the second area (shelter 1) so as to cover the demand power by one electric vehicle.

Figure 7:
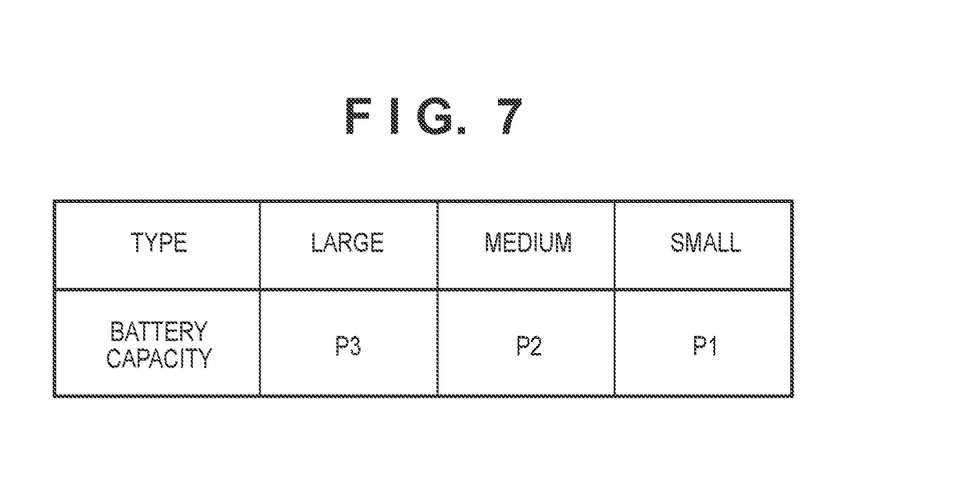
FIG. 7 is a view showing an example of the relationship between the type and battery capacity of an electric vehicle.

FIG. 7 is a view showing an example of the relationship between the type of electric vehicle and the battery capacity (supply power) in a fully charged state. FIG. 7 shows that the battery capacity P3 of a large vehicle is larger than the battery capacity P2 of a medium vehicle, and the battery capacity P2 of the medium vehicle is larger than the battery capacity P1 of a small vehicle (P3 (=P2+P1)>P2>P1). When determining allocation of electric vehicles, if a plurality of electric vehicles (EV1+EV2, or one EV3) are candidates for the allocation, the control unit 201 determines the allocation so as to select a vehicle type (the electric vehicle EV3) having a large battery capacity in a fully charged state based on the vehicle type information. An allocation like this can avoid a power shortage that occurs when an electric vehicle cannot be connected to a charger/discharger, by suppressing a mismatched allocation in which the number of electric vehicles is larger than that of chargers/dischargers corresponding to the destination as the movement destination.

In ST606, the control unit 201 determines whether there are a plurality of power system networks requesting electric power. If it is determined in ST606 that there is only one power system network requesting electric power, the control unit 201 advances the process to ST608. On the other hand, if it is determined in ST606 that there are a plurality of power system networks requesting electric power (ST606—Yes), the control unit 201 advances the process to ST607.

Figure 8:
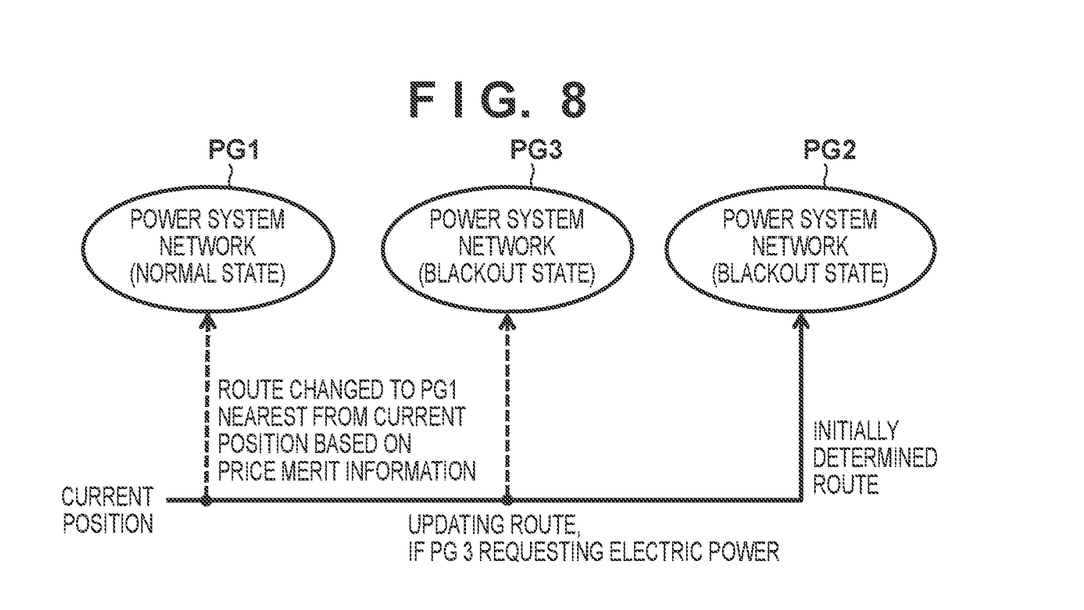
FIG. 8 is a view for explaining an example of a change in destination by allocation.

FIG. 8 is a view for explaining an example in which the allocation of electric vehicles is determined based on price merit information. In a state in which the route to the power system network PG2 in a blackout state is determined by the initial allocation process, a power system network requesting electric power is sometimes added by later sequential processing. As shown in FIG. 8, if there are a plurality of power system networks (PG1, PG2, and PG3) requesting electric power, the control unit 201 determines the allocation of electric vehicles based on the price merit information.

The control unit 201 calculates the power trading balance when a plurality of electric vehicles charge/discharge the batteries, and the traveling cost required for traveling of the plurality of electric vehicles based on the traveling power price, and calculates the price merit information as a result of subtracting the traveling cost from the trading balance resulting from charging/discharging. Then, the control unit 201 determines the allocation of electric vehicles so as to maximize the price merit information. Since the traveling cost can be reduced by shortening the traveling distance, the control unit 201 determines the allocation of electric vehicles by giving priority to a power system network nearest to the current position. For example, based on the comparison of the power system networks PG1 to PG3 shown in FIG. 8, the control unit 201 determines the allocation of electric vehicles by giving priority to the power system network PG1 nearest to the current position.

Also, when a plurality of power system networks (PG1, PG2, and PG3) requesting electric power include the power system network PG1 in a normal state and the power system network PG3 in a blackout state, the priority of the power system network PG3 in a blackout state can be set to be higher than that of the power system network PG1 in a normal state. In this case, the control unit 201 can determine the allocation of electric vehicles by setting a high priority for the power system network PG3 in a blackout state, which is positioned at a long distance compared to the power system network PG1 in a normal state.

If an electric vehicle having discharged electric power to a power system network in a blackout state charges equal electric power from a power system network in a normal state, the control unit 201 can set the cost required for the charging to 0. This can promote discharging to a power system network in a blackout state.

In ST608, the control unit 201 generates route information for guiding each electric vehicle to a charger/discharger based on the allocation determined in ST605. Then, the control unit 201 guides each of the plurality of electric vehicles based on the generated route information. Based on information of the route condition of the movement route for guiding each electric vehicle to a charger/discharger, the control unit 201 updates the route information in real time and distributes the information to each electric vehicle. For example, if a closed section is set midway along initially set route 1 (the movement route), the control unit 201 updates the route information in real time, and guides each of the plurality of electric vehicles based on updated route 2 (the movement route).

Also, if the guidance destination (destination) is changed from the charger/discharger 104 as the initially set guidance destination (destination) to another charger/discharger n because the demand powers of a plurality of areas in a power system network have changed, the control unit 201 generates route information (route 3) for guiding an electric vehicle to the changed guidance destination, and guides each of the plurality of electric vehicles based on the generated route information (route 3). The control unit 201 provides the generated route information (route 3) to the electric vehicle EV2 and guides it to the changed guidance destination.

SUMMARY OF EMBODIMENT

The above embodiment discloses at least the following arrangements.

Arrangement 1. A power information processing apparatus (for example, SV2) of the above embodiment comprises:

an obtaining unit (for example, 203, ST401-ST405, ST603, ST604) configured to obtain information of a power system network and information of a plurality of electric vehicles;

a determination unit (for example, 201, ST408, ST605, ST606, ST607) configured to determine, based on a comparison between demand power required in the power system network in a blackout state and supply power that can be supplied from the plurality of electric vehicles, allocation of an electric vehicle, of the plurality of electric vehicles, which is used to discharge electric power to the power system network; and a guiding unit (for example, 201, ST408, ST608) configured to guide, based on the allocation, each of the plurality of electric vehicles to a charging/discharging unit configured to discharge the electric power to the power system network.

The power information processing apparatus of Arrangement 1 can allocate and guide an electric vehicle as the supply side to the demand side of a power system network requiring electric power.

Arrangement 2. In the power information processing apparatus of the above embodiment, the determination unit determines the allocation of the electric vehicle such that the demand power and the supply power are equal (for example, 201, ST605).

The power information processing apparatus of Arrangement 2 can allocate an electric vehicle by balancing the demand side of a power system network and the electric vehicle as the supply side.

Arrangement 3. In the power information processing apparatus of the above embodiment, if a plurality of areas in the power system network require electric power, the determination unit compares demand powers of the areas and determines allocation by giving priority to an area having a large demand power (for example, 201, ST605).

The power information processing apparatus of Arrangement 3 can allocate an electric vehicle by giving priority to an area having large demand electric power in accordance with the needs for electric power.

Arrangement 4. In the power information processing apparatus of the above embodiment, the determination unit determines the number of electric vehicles to be allocated in accordance with the number of charging/discharging units as guidance destinations (for example, 201, ST605).

Arrangement 5. In the power information processing apparatus of the above embodiment, if a plurality of electric vehicles are candidates for allocation when determining allocation of the electric vehicle, the determination unit determines allocation such that an electric vehicle having a large battery capacity in a fully charged state is selected, based on information of types of the plurality of electric vehicles (for example, 201, ST605).

The power information processing apparatuses of Arrangements 4 and 5 can avoid a power shortage that occurs when an electric vehicle cannot be connected to a charger/discharger, by suppressing a mismatched allocation in which the number of electric vehicles is larger than that of chargers/dischargers corresponding to the destination as the movement destination.

Arrangement 6. In the power information processing apparatus of the above embodiment, the obtaining unit obtains, as information of the power system network, state information indicating whether the power system network is in a normal state or a blackout state, information indicating whether the power system network requires electric power, information indicating the position of the charging/discharging unit in the power system network, the amount of electric power required in the power system network, the timing at which electric power is necessary, and the blackout restoration status, and information of the power trading price of the power system network and the travelling power price required for travelling of the plurality of electric vehicles (for example, 203, ST401, ST403, ST405, ST603).

The power information processing apparatus of Arrangement 6 can allocate and guide an electric vehicle as the supply side to the demand side of a power system network requiring electric power, based on various kinds of information obtained from the power system network.

Arrangement 7. In the power information processing apparatus of the above embodiment, the obtaining unit obtains, as information of the plurality of electric vehicles, information indicating the positions of the plurality of electric vehicles and charged states of batteries mounted in the plurality of electric vehicles, and information indicating the types of the plurality of electric vehicles (for example, 203, ST406, ST604).

The power information processing apparatus of Arrangement 7 can allocate and guide an electric vehicle as the supply side to the demand side of a power system network requiring electric power, based on information obtained from a plurality of electric vehicles.

Arrangement 8. In the power information processing apparatus of the above embodiment, if there are a plurality of power system networks requiring electric power, the determination unit determines allocation of the electric vehicle based on price merit information calculated by using a power trading balance when the plurality of electric vehicles charge/discharge batteries, and a traveling cost required for traveling of the plurality of electric vehicles based on a traveling power price (for example, 201, ST607).

The power information processing apparatus of Arrangement 8 can reduce the traveling cost by shortening the traveling distance, and can determine allocation of an electric vehicle by giving priority to a power system network nearest to the current position. This makes it possible to determine allocation of an electric vehicle so as to maximize the price merit information.

Arrangement 9. In the power information processing apparatus of the above embodiment, if the plurality of power system networks requiring electric power include a power system network in a normal state and a power system network in a blackout state, the determination unit (201) determines allocation of the electric vehicle by setting priority of the power system network in a blackout state to be higher than that of the power system network in a normal state.

The power information processing apparatus of Arrangement 9 can allocate and guide an electric vehicle as the supply side to the demand side of a power system network, by taking account of the urgency of a power system network in a blackout state.

Arrangement 10. In the power information processing apparatus of the above embodiment, if an electric vehicle having discharged electric power to a power system network in a blackout state charges equal electric power from a power system network in a normal state, the determination unit (201) sets a cost required for the charging to 0.

The power information processing apparatus of Arrangement 10 can promote discharging to a power system network in a blackout state in response to a power request.

Arrangement 11. In the power information processing apparatus of the above embodiment, the guiding unit generates route information for guiding each electric vehicle to the charging/discharging unit based on the allocation determined by the determination unit, and guides each of the plurality of electric vehicles based on the generated route information (for example, 201, ST408, ST608).

The power information processing apparatus of Arrangement 11 can guide an electric vehicle as the supply side to the demand side of a power system network requiring electric power, based on the generated route information.

Arrangement 12. In the power information processing apparatus of the above embodiment, the guiding unit updates a change in the route information in real time and distributes the information to each electric vehicle, based on information of a route condition of a movement route for guiding each electric vehicle to the charging/discharging unit (for example, 201, ST408, ST409, ST608).

Arrangement 13. In the power information processing apparatus of the above embodiment, if a closed section is set midway along an initially set movement route, the guiding unit updates the route information and guides each of the plurality of electric vehicles based on the updated route information (for example, 201, ST408, ST409, ST608).

Arrangement 14. In the power information processing apparatus of the above embodiment, if a charging/discharging unit as an initially set guidance destination is changed to another charging/discharging unit because demand powers of a plurality of areas in the power system network have changed, the guiding unit generates route information for guiding an electric vehicle to the changed guidance destination, and guides each of the plurality of electric vehicles based on the generated route information (for example, 201, ST408, ST409, ST608).

The power information processing apparatuses of Arrangements 12, 13, and 14 can accurately guide each electric vehicle based on the route information.

Arrangement 15. In the power information processing apparatus of the above embodiment, the guiding unit notifies the plurality of electric vehicles of route information for guiding each electric vehicle to the charging/discharging unit based on the allocation, and price merit information when the electric vehicle moves to the charging/discharging unit (for example, 201, ST409).

The power information processing apparatus of Arrangement 15 can provide the user of an electric vehicle with information visualizing the power charge/discharge balance and the movement cost, together with the route information resulting from the movement.

Arrangement 16. In the power information processing apparatus of the above embodiment, when selecting a movement route from a current position of each of the plurality of electric vehicles to a charging/discharging unit as a guidance destination, the guiding unit (201) generates the route information by selecting a route in which the ratio of a flat route or a downhill route is high by avoiding an uphill route based on map information.

The power information processing apparatus of Arrangement 16 can reduce the power consumption in an electric vehicle, and maximally secure electric power that can be supplied.

Arrangement 17. A power information processing system (for example, 100) of the above embodiment comprises:
  an obtaining unit (for example, 203, ST401-ST405, ST603, ST604) configured to obtain information of a power system network and information of a plurality of electric vehicles;
  a determination unit (for example, 201, ST408, ST605, ST606, ST607) configured to determine, based on a comparison between demand power required in the power system network in a blackout state and supply power that can be supplied from the plurality of electric vehicles, allocation of an electric vehicle, of the plurality of electric vehicles, which is used to discharge electric power to the power system network; and a guiding unit (for example, 201, ST408, ST608) configured to guide each of the plurality of electric vehicles to a charging/discharging unit configured to discharge the electric power to the power system network, based on the allocation.

The power information processing system of Arrangement 17 can allocate and guide an electric vehicle as the supply side to the demand side of a power system network requiring electric power.

Arrangement 18. A power information processing method of the above embodiment is a power information processing method for a power information processing apparatus (for example, SV2), comprising:

an obtaining step (for example, 203, ST401-ST405, ST603, ST604) of obtaining information of a power system network and information of a plurality of electric vehicles;

a determination step (for example, 201, ST408, ST605, ST606, ST607) of determining, based on a comparison between demand power required in the power system network in a blackout state and supply power that can be supplied from the plurality of electric vehicles, allocation of an electric vehicle, of the plurality of electric vehicles, which is used to discharge electric power to the power system network; and a guiding step (for example, 201, ST408, ST608) of guiding, based on the allocation, each of the plurality of electric vehicles to a charging/discharging unit configured to discharge the electric power to the power system network.

The power information processing method of Arrangement 18 can allocate and guide an electric vehicle as the supply side to the demand side of a power system network requiring electric power.

The invention is not limited to the foregoing embodiments, and various variations/changes are possible within the spirit of the invention.

What is claimed is:

1. A power information processing apparatus comprising:
an obtaining unit configured to obtain information of a power system network and information of a plurality of electric vehicles;
a determination unit configured to determine, based on a comparison between demand power required in the power system network in a blackout state and supply power that can be supplied from the plurality of electric vehicles, allocation of an electric vehicle, of the plurality of electric vehicles, which is used to discharge electric power to the power system network; and
a guiding unit configured to guide, based on the allocation, each of the plurality of electric vehicles to a charging/discharging unit configured to discharge the electric power to the power system network,
wherein the guiding unit generates route information for guiding each of the plurality of electric vehicles to the charging/discharging unit based on the allocation determined by the determination unit, and guides each of the plurality of electric vehicles based on the generated route information, and
the guiding unit performs route search from current positions of the plurality of electric vehicles to the charging/discharging unit, based on the route information, and when the route information indicates that road closure occurs in a partial section, the guiding unit changes a route in real time, by selecting a shortest route by using distance to the charging/discharging unit as a parameter.

2. The apparatus according to claim 1, wherein the determination unit determines the allocation of the electric vehicle such that the demand power and the supply power are equal.

3. The apparatus according to claim 1, wherein if a plurality of areas in the power system network require electric power, the determination unit compares demand powers of the areas and determines allocation by giving priority to an area having a large demand power.

4. The apparatus according to claim 1, wherein the determination unit determines the number of electric vehicles to be allocated in accordance with the number of charging/discharging units as guidance destinations.

5. The apparatus according to claim 1, wherein if a plurality of electric vehicles are candidates for allocation when determining allocation of the electric vehicle, the determination unit determines allocation such that an electric vehicle having a large battery capacity in a fully charged state is selected, based on information of types of the plurality of electric vehicles.

6. The apparatus according to claim 1, wherein the obtaining unit obtains, as information of the power system network, state information indicating whether the power system network is in a normal state or a blackout state, information indicating whether the power system network requires electric power, information indicating the position of the charging/discharging unit in the power system network, the amount of electric power required in the power system network, the timing at which electric power is necessary, and the blackout restoration status, and information of a power trading price of the power system network and a travelling power price required for travelling of the plurality of electric vehicles.

7. The apparatus according to claim 1, wherein the obtaining unit obtains, as information of the plurality of electric vehicles, information indicating the positions of the plurality of electric vehicles and charged states of batteries mounted in the plurality of electric vehicles, and information indicating the types of the plurality of electric vehicles.

8. The apparatus according to claim 6, wherein if there are a plurality of power system networks requiring electric power, the determination unit determines allocation of the electric vehicle based on price merit information calculated by using a power trading balance when the plurality of electric vehicles charge/discharge batteries, and a traveling cost required for traveling of the plurality of electric vehicles based on a traveling power price.

9. The apparatus according to claim 8, wherein if the plurality of power system networks requiring electric power include a power system network in a normal state and a power system network in a blackout state, the determination unit determines allocation of the electric vehicle by setting priority of the power system network in a blackout state to be higher than that of the power system network in a normal state.

10. The apparatus according to claim 8, wherein if an electric vehicle having discharged electric power to a power system network in a blackout state charges equal electric power from a power system network in a normal state, the determination unit sets a cost required for the charging to 0.

11. The apparatus according to claim 1, wherein when selecting a movement route from a current position of each of the plurality of electric vehicles to a charging/discharging unit as a guidance destination, the guiding unit generates the route information by selecting a route in which a ratio of a flat route or a downhill route is high by avoiding an uphill route based on map information.

12. The apparatus according to claim 1, wherein the guiding unit updates a change in the route information in real time and distributes the information to each electric vehicle, based on information of a route condition of a movement route for guiding each electric vehicle to the charging/discharging unit.

13. The apparatus according to claim 1, wherein if a closed section is set midway along an initially set movement route, the guiding unit updates the route information and guides each of the plurality of electric vehicles based on the updated route information.

14. The apparatus according to claim 3, wherein if a charging/discharging unit as an initially set guidance destination is changed to another charging/discharging unit because demand powers of a plurality of areas in the power system network have changed, the guiding unit generates route information for guiding an electric vehicle to the changed guidance destination, and guides each of the plurality of electric vehicles based on the generated route information.

15. The apparatus according to claim 8, wherein the guiding unit notifies the plurality of electric vehicles of route information for guiding each electric vehicle to the charging/discharging unit based on the allocation, and price merit information when the electric vehicle moves to the charging/discharging unit.

16. A power information processing method for a power information processing apparatus, comprising:
- an obtaining step of obtaining information of a power system network and information of a plurality of electric vehicles;
- a determination step of determining, based on a comparison between demand power required in the power system network in a blackout state and supply power that can be supplied from the plurality of electric vehicles, allocation of an electric vehicle, of the plurality of electric vehicles, which is used to discharge electric power to the power system network; and
- a guiding step of guiding, based on the allocation, each of the plurality of electric vehicles to a charging/discharging unit configured to discharge the electric power to the power system network, wherein the guiding step generates route information for guiding each of the plurality of electric vehicles to the charging/discharging unit based on the allocation determined in the determination step, and guides each of the plurality of electric vehicles based on the generated route information, and the guiding step performs route search from current positions of the plurality of electric vehicles to the charging/discharging unit, based on the route information, and when the route information indicates that road closure occurs in a partial section, the guiding step changes a route in real time, by selecting a shortest route by using distance to the charging/discharging unit as a parameter.

17. A power information processing system comprising:
- an obtaining unit configured to obtain information of a power system network and information of a plurality of electric vehicles;
- a determination unit configured to determine, based on a comparison between demand power required in the power system network in a blackout state and supply power that can be supplied from the plurality of electric vehicles, allocation of an electric vehicle, of the plurality of electric vehicles, which is used to discharge electric power to the power system network; and
- a guiding unit configured to guide, based on the allocation, each of the plurality of electric vehicles to a charging/discharging unit configured to discharge the electric power to the power system network, wherein the guiding unit generates route information for guiding each of the plurality of electric vehicles to the charging/discharging unit based on the allocation determined by the determination unit, and guides each of the plurality of electric vehicles based on the generated route information, and the guiding unit performs route search from current positions of the plurality of electric vehicles to the charging/discharging unit, based on the route information, and when the route information indicates that road closure occurs in a partial section, the guiding unit changes a route in real time, by selecting a shortest route by using distance to the charging/discharging unit as a parameter.

\* \* \* \* \*